Inventor
RAYMOND LOUIS ANDRE VALTAT
By Frederick E. Hane
Attorney

Dec. 9, 1952 R. L. A. VALTAT 2,620,974

BINARY NETWORK TYPE CALCULATING MACHINE

Filed May 12, 1948 5 Sheets-Sheet 2

Inventor
RAYMOND LOUIS ANDRE VALTAT

By Frederick S. Haus
Attorney

BINARY NETWORK TYPE CALCULATING MACHINE

Filed May 12, 1948 5 Sheets-Sheet 3

Inventor
RAYMOND LOUIS
ANDRE VALTAT
By [signature]
Attorney

BINARY NETWORK TYPE CALCULATING MACHINE

Inventor
RAYMOND LOUIS
ANDRE VALTAT
By [signature]
Attorney

Dec. 9, 1952 R. L. A. VALTAT 2,620,974

BINARY NETWORK TYPE CALCULATING MACHINE

Filed May 12, 1948 5 Sheets-Sheet 5

Inventor
RAYMOND LOUIS ANDRE VALTAT
By Frederick E. Hane
Attorney

Patented Dec. 9, 1952

2,620,974

UNITED STATES PATENT OFFICE 2,620,974

BINARY NETWORK TYPE CALCULATING MACHINE

Raymond L. A. Valtat, Bosc-Nouvel, France

Application May 12, 1948, Serial No. 26,537
In Great Britain March 31, 1947

5 Claims. (Cl. 235—61)

Figures 4A, 4C:
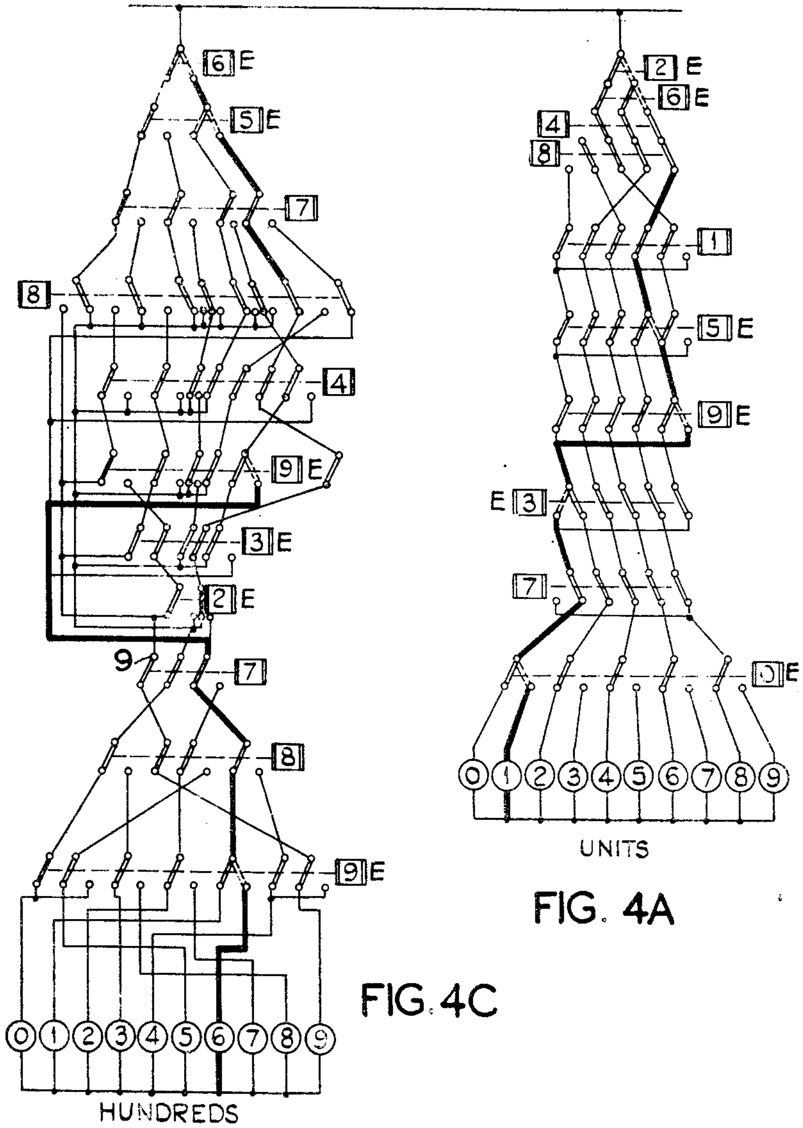

This invention relates to calculating apparatus operating in the binary system of notation, and has for its object a method and an apparatus for translating a number expressed in the binary notation into a number expressed in a decimal or other notation, such as the mixed notation of pounds, shillings and pence.

It is known that the binary notation offers advantages when used for certain calculations, but it has the objection that, hitherto, no method has been known for translating the results of the calculations into decimal numbers quickly enough for the needs of many calculating machines. By the method and apparatus which is the subject of the invention, the translation may be effected in a small fraction of a second after entering the binary number.

It has been proposed to translate from binary notation to decimal notation, utilising the principle of successive addition of the values as expressed in decimal and relaying on a thermionic valve counter to deal with the successive carries produced by addition, with the result that in spite of the use of valves giving great speed the translated value is still obtainable only successively in the several denominations.

According to the invention a value recorded in binary notation may be translated into another notation represented by more than one denomination such that the said other value may be read out simultaneously in the several said other denominations through switches linked in chain circuits and set by the binary recording means.

The apparatus may be operated electrically, by electro-mechanical or valve relays, or it may be operated mechanically. It is believed that electro-mechanical relays are the most convenient means of operation and the examples shown and described in detail comprise these means, but it is explained by brief descriptions how valve relays or mechanical devices may be substituted for the electro-mechanical relays.

This is carried out by adding together the digits of the lowest denomination of all the powers of two represented in the binary number and expressed in the said other notation, while neglecting carries resulting from the addition, and in adding together the digits of a higher denomination and, simultaneously, the digits of all lower denominations, which serve to determine the carry from all digits of lower denomination, while neglecting in their sum the digits of the lower denominations, and adding the carry so determined to the digits of the said higher denomination, and similarly for each denomination except the lowest, whereby the calculation of each digit of the translated number is independent of the calculation of the other digits.

In accordance with a modified form of the invention, for each denomination of the number in the said other notation other than the lowest, there may be added together approximate values of the powers of two represented in the binary number, while neglecting digits of denominations higher than the said denomination, and there may be added therewith the difference between said approximate values and the true values while neglecting in the sum of the differences digits of denomination below the said denomination, differences constituting an excess of the approximate over the true value being added negatively and differences constituting a deficit positively, and adding together the lowest digits of the powers of two represented in the binary number while neglecting carries resulting from said addition, to determine the lowest digit of the translated number.

An apparatus for carrying out the translation consists of an adding device for each denomination in the said other notation, the adding device for the lowest denomination being adapted to add simultaneously the lowest digits of all powers of two represented in the binary number, while neglecting any carries to a higher denomination, and the adding device for each higher denomination being adapted to add simultaneously the digits in said higher denomination of all the powers of two represented in the binary number, and also such digits of all lower denominations which serve to determine the carry to the said higher denomination from the lower denominations, the carry so determined being added, also simultaneously, with the digits of the said higher denomination, while carries from the said higher denomination are neglected, means for entering into the adding devices all the powers of two represented in the binary number either positively or negatively and means for indicating or recording the digit resulting from the addition in each adding device.

Figure 1:
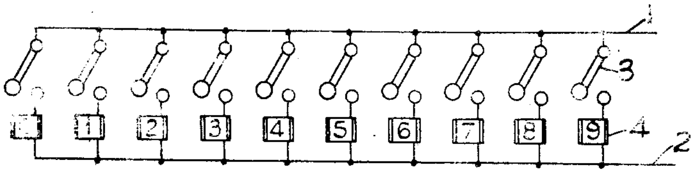
Figures 2A, 2B:
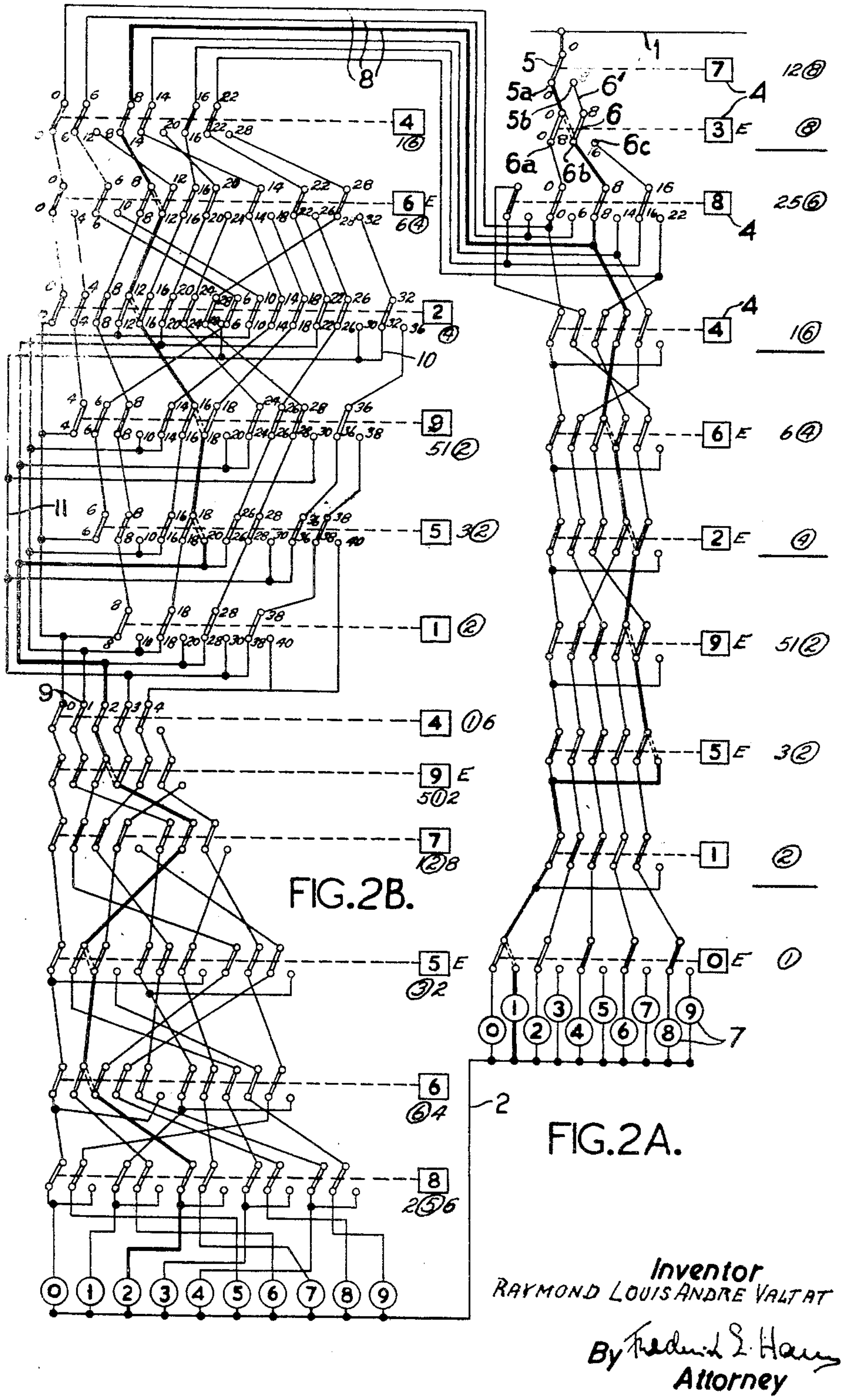
Figure 2C:
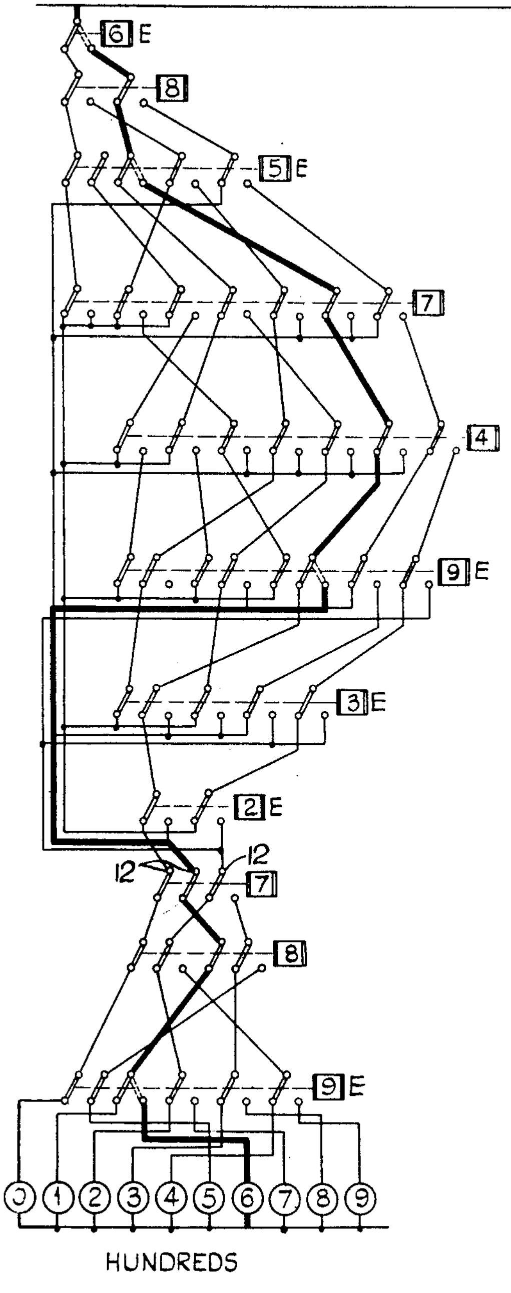
Figure 3A:
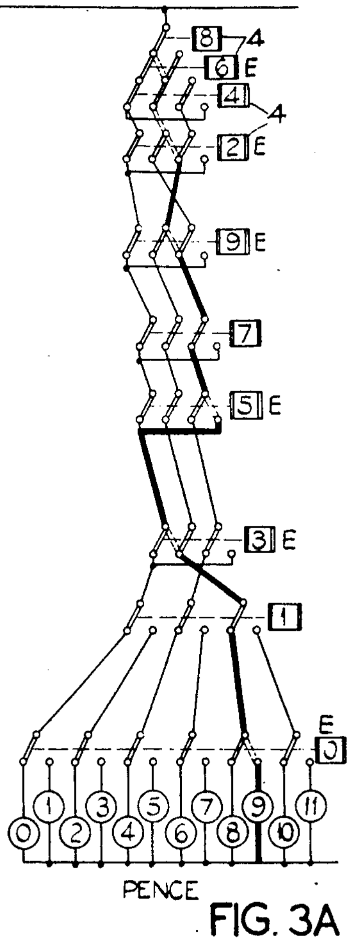
Figure 5:
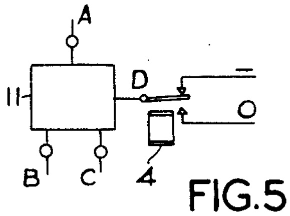
Figure 6:
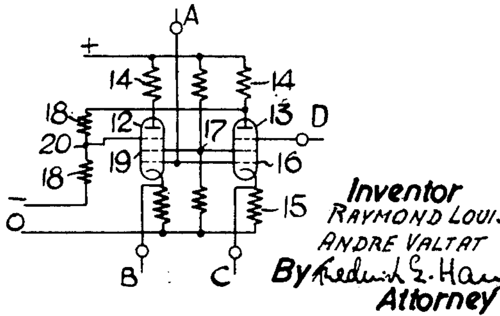
Figures 3B, 3C, 3D, 4B:
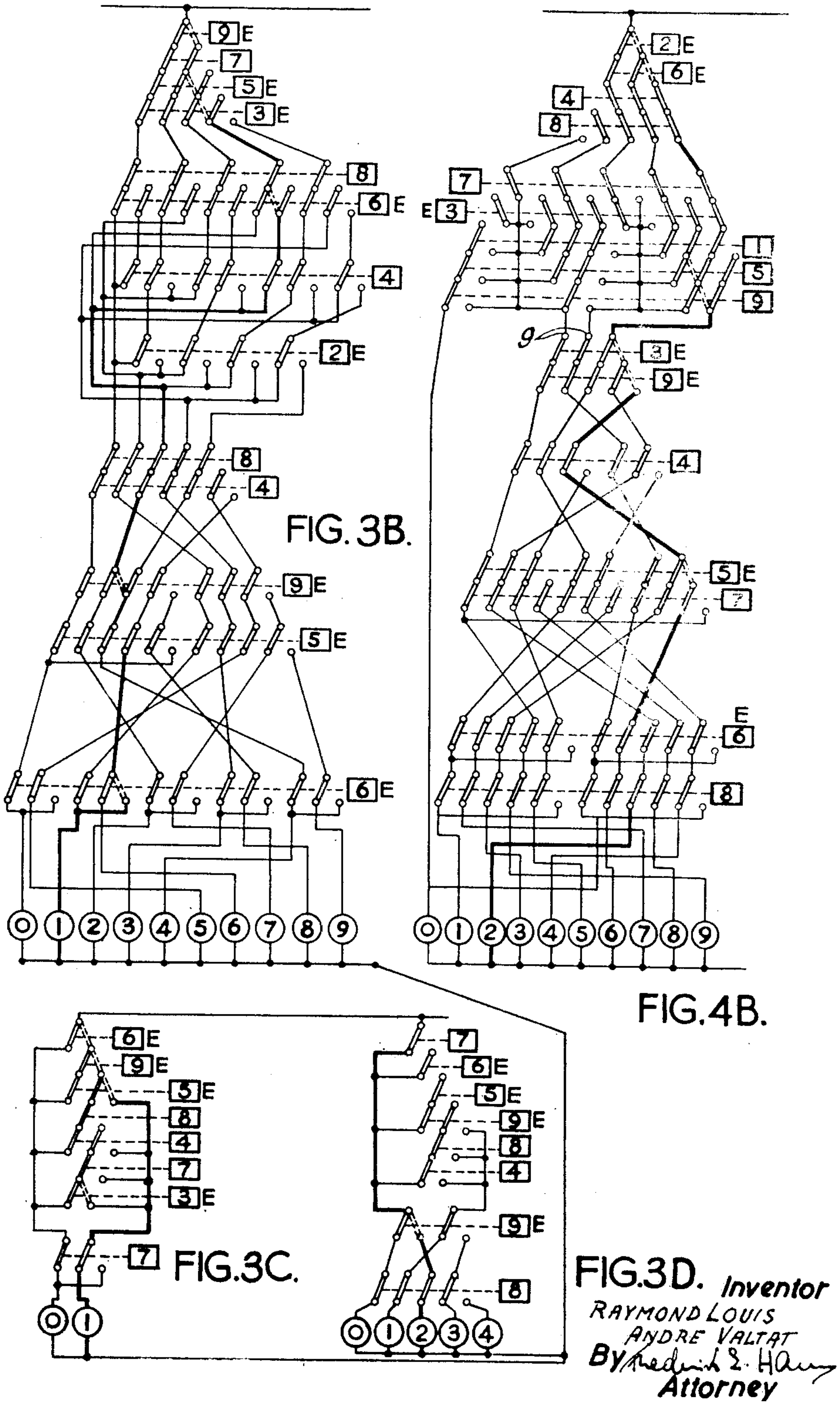
Figure 7:
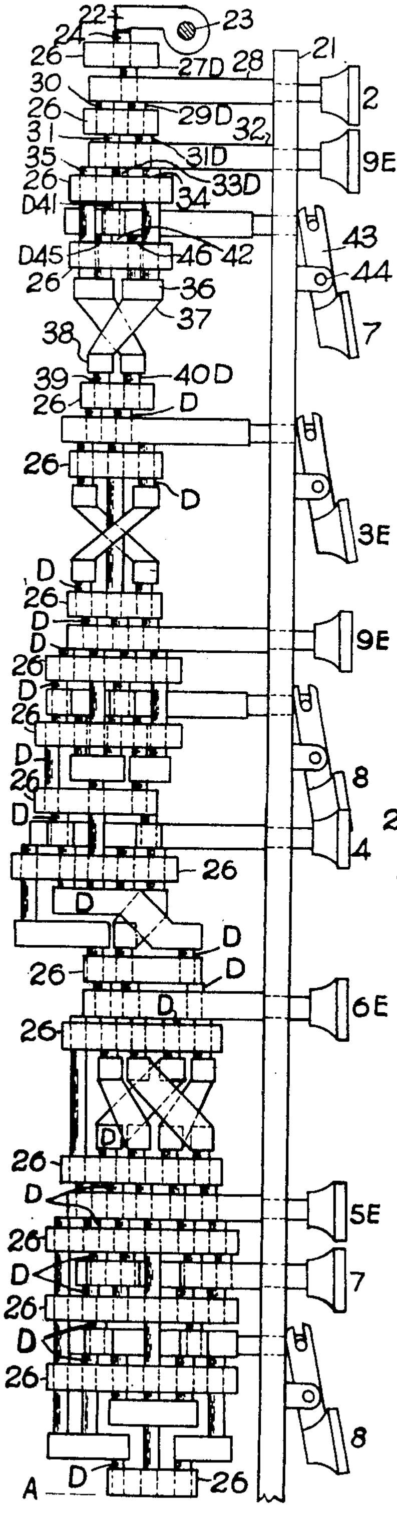
Figure 7:
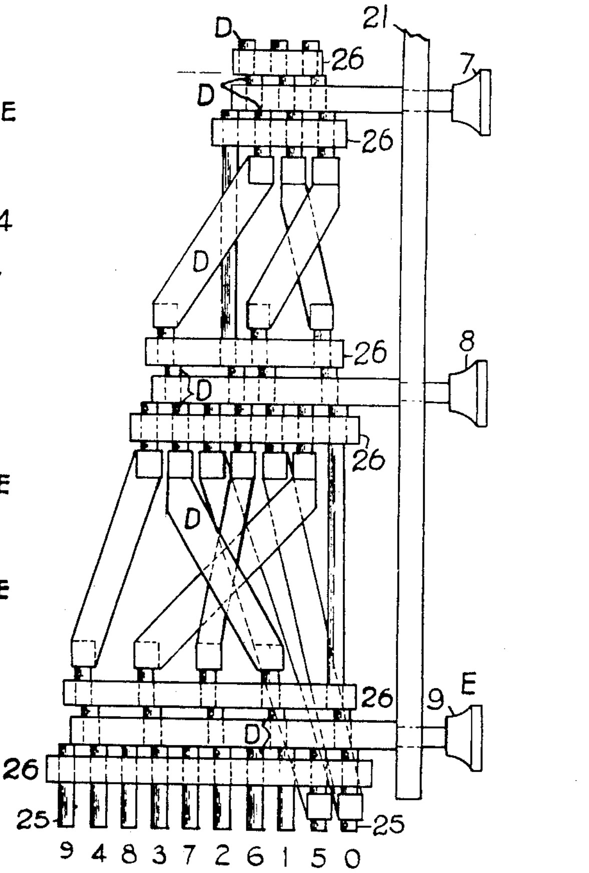

In the accompanying drawings, which show by way of example alternative ways of carrying out the invention;

Figure 1 is a diagram of a keyboard for entering the binary number into the apparatus, Figures 2A and 2B are diagrams of adding chains for translating a binary number into a decimal number, Figures 3A and 3B are diagrams of adding chains for translating a binary number of pence into a sum of pounds, shillings and pence, Figures 4A, 4B and 4C are diagrams of alternative forms of adding chains for translating a binary number into a decimal number, Figures 5 and 6 are diagrams indicating the means of using valves in place of contact arms, and Figure 7 is a view, to some extent diagrammatic, of a mechanical apparatus for obtaining the hundreds digit of a decimal number translated from a binary number.

Referring to Figures 1, 2A, 2B, and considering by way of example the binary number 1001101101, this has the decimal equivalent of 621, made up as follows:

$$\begin{matrix} 2^9 & 2^6 & 2^5 & 2^3 & 2^2 & 2^0 \\ 512 & 64 & 32 & 8 & 4 & 1 \end{matrix}$$

The units of these component decimal numbers are added up in the Units chain shown to the right in Figure 2A, the tens in the Tens chain shown to the left in Figure 2A and the hundreds in the Hundreds chain shown in Figure 2B. The Tens chain, however, has a preliminary part in which the carries from the units denominations are reckoned, and the Hundreds chain has a preliminary part in which the carries from the units and tens denominations are reckoned.

The mathematical procedure may best be understood by referring to the following Table I which shows for one modification of the invention the additive arrangement of the terms of the binary progression for three decimal denominational orders.

*Table I*

| Hundreds | Tens | Units |
|---|---|---|
| 64 | 128 | 128 |
| 256 | 8 | 8 |
| 32 | 256 | 256 |
| 218 | 16 | 16 |
| 16 | 64 | 64 |
| 512 | 4 | 4 |
| 8 | 512 | 512 |
| 4 | 32 | 32 |
| | 2 | 2 |
| | | 1 |
| 120 | 20 | 1 |
| 128 | 16 | |
| 256 | 512 | |
| 512 | 128 | |
| | 32 | |
| | 64 | |
| | 256 | |
| 6 | 12 | 21 |

In Table I, the values listed in the units order represent the terms of the binary progression from 1 to 512 arranged in an order most convenient for summation circuit purposes and any value up to 1023 may be represented thereby. Certain of these terms are underscored, the particular ones chosen being the terms of the binary number 621. In the units order, the right hand or units digit of the binary terms are summed to obtain the result 21. The carry is disregarded and in fact is not obtained as such.

If the tens order, there are represented in the upper part thereof the same terms of the progression as in the units order, with the exception of the first term 1, and in the lower part there are represented only the terms having two decimal place significance. The summation network controlled by the upper part with units digit of the result disregarded produces the digit 2, which represents what might be termed the tens carry value, although in accordance with the present invention it is not carried from the units order but is separately formulated in the tens order to be summed with the tens digits in this same order to produce the ultimate tens digit 2. The accompanying hundred digit 1 is disregarded and is not manifested.

In the hundreds order, the upper section includes all the binary terms except the first and second, while the lower section includes only the terms having three decimal place significance. In this order the units and tens places are summed to obtain the hundreds digit (such as 1, for example), and this 1 is then summed with the hundreds order digit to obtain the ultimate hundreds order digit 6, as indicated. The Table I shows that for each decimal order there is a summation of the full decimal equivalents of all binary terms entering into the appropriate decimal digit independently of the operation in any other decimal order.

The binary number is set up on the keyboard shown in Figure 1, consisting of 10 switches 3, each of which, when closed, completes a circuit through a related relay coil 4 from supply line 1 to supply line 2. Each relay coil 4 represents one of the powers of two, 0 to 9, which is indicated by figures 0 to 9 on the coil. The number is set up by energising the relay coils representing the powers of two contained in the binary number. The relay coils 4, 0 to 9 are shown in Figure 2A and are also shown in Figure 2B, though they are the same coils, that is to say, a single relay coil 4, representing a given power of two, controls a series of contact arms in all three chains.

Considering first the Units chain of Figure 2A, and starting from the top, the contact arm 5 is connected to the supply line 1 and, normally, is on contact 5*a*. If the relay 4, 7 be energised, the arm is moved to contact 5*b*. The units denomination of $2^7$ is 8, so contact 5*a* represents 0 and contact 5*b* 8. The next lower contact arms 6 and $\mathbf{6}^1$ are controlled by relay coil 4, 3, also representing 8, so contact 6*a* represents 0, 6*b* 8 and 6*c* 16. Since only the units denomination is dealt with in this chain, the 10 in 16 is neglected, and contacts 6*c* represents 6.

The lower series of contact arms controlled by their respective relay coils 4 operate similarly to add the units denomination represented by the relay coil into the chain. Where the value 10 is reached at any contact point, this is connected to the 0 contact point and the 10 in any higher value is neglected. The chain terminates in 10 indicating lamps 7, connected in common to the supply line 2. For any given combination of energised relay coils 4 a circuit is traceable through the chain and through the indicating lamp 7 which represents the units denomination of the sum of the powers of two represented by the energised relay coils 4. The circuit for the powers of two in the binary number taken as example is indicated as follows: the relay coils 4 energised have E against them, the relevant contact arms moved by them are shown in dotted lines, and the connections are shown by heavy lines. The indicating lamp operated is 1.

In the drawings, Figs. 2A and 2B, the values of the terms of the binary progression are written alongside the relays 4, denoting the different powers of 2 more readily to correlate the relays with the terms as employed in Table I hereinabove.

The order in the chain in which the relay coils are arranged is immaterial as far as the result is concerned, but it affects the number of contact arms required. It is seen that the relay coils representing the same units digit are adjacent, and that those representing larger digits precede.

Coming now to the Tens chain, the portion of the chain controlled by the first three relays 4 is the same as in the Units chain, so this portion is used in common for the Units and Tens chains, by the connecting lines 8. The upper portion down to the 5 contact points 9, which represent values, from the left 0, 10, 20, 30, 40, or 0, 1, 2, 3, 4, in the tens denomination is an adding chain for the unit denominations only. It differs, however, from the Units chain in that tens are not neglected but the units are neglected, as soon as a value is reached which cannot be increased to a higher tens value by addition of all the units represented by the subsequent relay coils. For example, the two contact points 10 represent values of 30 and 32; the units represented by the three following relay coils 4, of powers 9, 5 and 1 are each 2, totalling 6; 30 and 32 can therefore reach only 36 and 38 as maxima, and the carry is 3 in any case. These two contact points, are, therefore, connected by the line 11 to the contact point 9 representing 3 in the tens denomination, namely, the carry to be added to the tens values which are added in the lower portion of the chain.

In this lower part, the values added are the tens denominations only, the relays representing the 4, 9, 7, 5, 6 and 8 powers of two adding, respectively, 1, 1, 2, 3, 6 and 5. The circuit traceable for the binary number assumed is indicated by the same conventions as in the Units chain, showing that the indicating lamp operated is 2 (see also Table I above).

The Hundreds chain (Figure 2B) is similarly in two parts, the upper part adding the tens and units denominations of all powers of two represented by the relays energised and bringing the result of the addition, with tens and units neglected to one of the three contact points 12, representing the values 0, 100, 200, or carries of 0, 1, 2 in the hundreds denomination. The lower portion of the chain adds the hundreds denomination of the powers of two represented by the energised relays. The circuit traceable for the binary number assumed is indicated as before, showing that the indicating lamp operated is 6 (see also Table I above).

It is seen that the three chains are quite independent, each connected between the supply lines 1 and 2 and all controlled by the same set of relays 4. The fact that the Units and Tens chains have a first portion in common, does not affect their independence, since this portion could be repeated for the two chains.

Once the binary number has been set up to energise the relevant relays, the translation to the decimal number is shown on the three banks of indicating lamps in the time of operation of the relays; which may be a time of 10 to 20 milliseconds.

It is to be particularly noted that each chain of contacts, which produces only a computed result appropriate to that denomination with no carry to or from any other, the correct carry is generated within its own denomination, that is, a carry into the tens denomination is not derived from part of the units chain but from contacts forming an integral part of the tens chain. By this means the carry is automatically accounted for in the computed value and does not have to be added separately as a corrective. Consider, for example, the units and tens chain shown in Fig. 2A, although in this particular case the tens chain input is shown coming from contacts in the units chain. This is done solely to effect a saving in contacts and the operation may be clearer if it be imagined that the tens chain comes from the supply line through a duplicate set of contacts belonging to the 7, 3 and 8 relays as represented in Table I.

Figures 3A and 3B show chains for translating a binary number into pence, shillings, tens of shillings and pounds, respectively. The chains are similar to those of Figure 2, with the exception that in the Pence chain twelves are neglected instead of tens, a value of 14 for example being regarded as 2, and a contact point with value 12 being connected to a zero contact point. Also in the Ten Shillings chain, the value 2 is equivalent to 0.

In this case the powers of two represented by the relays 4 are expressed in the pounds, shillings and pence notation. Thus, $2^9$ is £2.2.8., $2^8$ is £1.1.4., and so on, and for example, the pence figures of these amounts are entered into the pence chain.

The circuits traceable for the binary number assumed are indicated as before, giving the translated result of £2.11.9. Translation can be effected similarly into amounts in any notation or mixed notation.

Figures 4A, 4B, 4C show addition chains for translation into a decimal number which differ from those of Figures 2A and 2B employing a device which simplifies the Tens and Hundreds chains. Consider the following table:

| | | | | | | | | | |
|---|---|---|---|---|---|---|---|---|---|
| Power of two | 1 | 2 | 3 | 4 | 5 | 6 | 7 | 8 | 9 |
| Decimal value | 2 | 4 | 8 | 16 | 32 | 64 | 128 | 256 | 512 |
| Approximate tens figure | 0 | 0 | 1 | 2 | 3 | 6 | 3 | 6 | 1 |
| Approximate hundreds figure | 0 | 0 | 0 | 0 | 0 | 1 | 1 | 3 | 5 |

The approximate tens and hundreds figures are the nearest integers to the true values, having regard to the units values and units and tens values respectively. In the case of the powers of 3, 4, 7 and 8, the approximate tens figures are in excess of the actual figures, and the excess amounts are corrected in the upper, or carry determining portion of the Tens chain by employing series of contact arms which have the effect of adding negatively or subtracting the excess amount. Thus, taking the approximate tens figures shown above, the amounts to be added positively or negatively to determine the carry are shown in the following table:

| | | | | | | | | | |
|---|---|---|---|---|---|---|---|---|---|
| Power of two | 1 | 2 | 3 | 4 | 5 | 6 | 7 | 8 | 9 |
| To be added positively | 2 | 4 | | | 2 | 4 | | | 2 |
| To be added negatively | | | 2 | 4 | | | 2 | 4 | |

The following Table II illustrates graphically the mathematical procedure involved in this modified form which is substantially in accordance with the procedure explained in connection with Table I, the exception being noted in the units decimal order, where for the terms 1 6 and 2 5 6, instead of there being an addition of the digit 6, there is a subtraction of the digit 4, and also in place of the addition of digit 8 for the terms 8 and 1 2 8, there is a subtraction of the digit 2, it being noted that these subtracted digits are the units portion of the tens complement. Thus, for the same example as illustrated in Table I, we have the summation of 4, 4, 2, −2, and 1, resulting in the units decimal digit of 1, the carry digit being disregarded and in fact not manifested.

*Table II*

| Hundreds | Tens | Units |
|---|---|---|
| 6 4 | 4 | 4 |
| 3 2 | 6 4 | 6 4 |
| 1 2 8 | 1 6 (−4) | 1 6 ( −4) |
| 2 5 6 (−4 4) | 2 5 6 (−4) | 2 5 6 ( −4) |
| 1 6 | 1 2 8 (−2) | 2 |
| 5 1 2 | 8 (−2) | 3 2 |
| 8 | 2 | 5 1 2 |
| 4 | 3 2 | 8 ( −2) |
| | 5 1 2 | 1 2 8 (−2) |
| | | 1 |
| 1 2 2 | 1 0 | 1 |
| 1 2 8 | 8 (+1 0) | |
| 2 5 6 (+3 0 0) | 5 1 2 | |
| 5 1 2 | 1 6 (+2 0) | |
| | 3 2 | |
| | 1 2 8 (+3 0) | |
| | 6 4 | |
| | 2 5 6 (+6 0) | |
| 6 | 1 2 | 1 1 |

In the tens order, there is again the substitution of −4 for 6 and −2 for 8 in the upper section, while in the lower section there is a substitution in the tens place of the values indicated. Specifically, for the 8 term the value 10 is substituted which together with the −2 value in the upper section simply express 8 in two parts. Likewise, for the term 16 this is expressed as +2 0 − 4, while for the two places in the two lowest orders of the term 1 2 8 this is expressed as +2 0 − 2, and for the two places of the term 2 5 6, this is expressed as +6 0 − 4. The division of several of these terms into components, as explained, simplifies the summation, particularly in the upper part of the tens decimal order where it will be noted that only the digits 4 and 2 are entered. As will be noted hereafter in connection with the circuits, this considerably simplifies the connections.

In the hundreds decimal order, the summation network follows Table I substantially, with the exception that for the term 2 5 6, there is substituted the two parts +3 0 0 − 4 4.

In the carry determining portion of the Tens chain, shown in Figure 4B, therefore, down to the three carry terminals 9, the relays 4 of powers 1, 2, 5, 6, 9 are arranged to add the amounts shown, while the relays of powers 3, 4, 7, 8 are arranged to add negatively the amounts shown, by moving their contact arms, when energised, in the reverse direction. It may be noted that the amounts to be added are either 2 or 4, and that there are three carry terminals 9 instead of the five terminals 9 of the Tens chain of Figure 2B, the values of the three terminals 9 in Figure 4B being, from the left, −1 (or 9), 0, 1. For these reasons the chain of Figure 4B is much simpler than that of Figure 2B (see also Table II hereinabove).

Similar considerations apply in the case of the Hundreds chain of Figure 4C, though here it is more convenient to take the approximate hundreds figure for the power 6 as 0 instead of 1. Then only in the case of the power of 8 is there an excess in the approximate figure 44. The numbers to be added positively or negatively then are omitting the power 1 which has no effect on the carry:

| | | | | | | | | |
|---|---|---|---|---|---|---|---|---|
| Power of two | 2 | 3 | 4 | 5 | 6 | 7 | 8 | 9 |
| To be added positively | 4 | 8 | 16 | 32 | 64 | 28 | | 12 |
| To be added negatively | | | | | | | 44 | |

As in the case of Figure 4B, three carry lines with values −1, 0, 1 are brought to the terminals 9 of the lower portion of the chain.

These numbers may also be added in two stages, that is to say, the units digits may be added to determine the carry to the tens digits and these may be added with any carry to determine the carry to the hundreds denomination. In this case, two sets of contact arms, controlled by a relay representing the same power of two, will appear in the adding chain.

In the Figures 4A, 4B, and 4C, the circuits traceable for the binary number assumed are indicated as before.

In the Units chain, Figure 4A, the device of reverse acting relays is used merely to simplify the chain by the use of smaller numbers. It is immaterial to the result when tens are neglected, whether a number is added positively or its complement to 10 added negatively.

It is obvious that the relays 4 may be energised from any apparatus which represents binary numbers. Thus, if a calculating machine operates in the binary notation, the accumulator or register which is operated to give the results of a calculation can close contacts representing 1's in the binary number, and circuits through such closed contacts may energise the relays 4. The translation of such binary number may, for instance, be printed in an electrically controlled printing apparatus by substituting a print magnet for the lamps 7 in each denomination, with suitable omitter in the case of cyclically operating apparatus. The multiple switches in the adding chains which are controlled by relays 2, may be replaced by valve circuits in known ways, of which an example is given in the following.

Referring to Figure 5, A is a terminal in an adding chain at which a contact ram such as 5 (Figure 2A) is pivoted, the contact arm normally making contact with B (*5a* in Figure 2A), but, when the relay 4 is energised to connect point D with a line at 0 volts, instead of a negative line, makes contact with C (*5b* in Figure 2A). The valve circuit is contained in the rectangle 11, and is shown in detail in Figure 6. A pair of pentodes 12 and 13 is connected between the lines + and 0 through anode resistances 14 and cathode resistances 15. The heater circuit is omitted. The control grids 16 are connected to terminal A. The screen grids are connected to the point 17 on a potentiometer connected between lines + and 0. The anode of valve 13 is connected to line − through two resistances 18. The suppressor grid 19 of valve 12 is connected to a point between these resistances and the suppressor grid of valve 13 is connected to a terminal D maintained negative, a rise of voltage at D corresponding to energisation of a relay 4 in Figure 2A.

Assume now that A is at 0 volts, that is to say, that A is in a link of the chain disconnected from the starting point of the chain. The various resistances are so chosen that then neither valve is conducting appreciably and therefore terminals B and C are substantially at the same voltage as A. Suppose now that A is made positive at 20 volts, that is to say, A is connected to the starting point of the chain by intermediate links. The potential of the two control grids 16 is then raised to a point at which the valves can conduct if permitted to do so by their suppressor grids 19 and 21. Suppressor grid 21 and valve 13 being connected to negative terminal D, prevents valve 13 conducting; its anode, therefore, is at high potential, and point 20 and suppressor grid 19 of valve 12 are not negative; valve 12 therefore conducts, and terminal B will become positive, say 20 volts. Voltage conditions then are: A at 20 plus, D negative, valve 12 conducting, C at 0, B at 20 plus. This condition corresponds to a contact arm of Figure 2A being in its normal position and connected to the start of the chain by the intermediate links.

Now suppose that the voltage of D is raised to 0. Valve 13 then conducts, lowering its anode voltage and lowering the voltage of point 20 to, say, −20 volts. This cuts off valve 12 and the voltage condition then is: A at 20 plus, D at 0, valve 12 cut off, valve 13 conducting, B at 0, C at 20 plus. This condition corresponds to a contact arm of Figure 2A having been moved over from its normal to the other contact.

Actually the relay 4 shown in Figure 5 is unnecessary; it has been inserted to show an arrangement equivalent to that of Figure 2A. The contact arm shown pivoted at D can take the place of one of the switches 3 shown in Figure 1, for entering a binary denomination.

Figure 7 shows, to some extent diagrammatically, a mechanical form of the transulating apparatus. It is a mechanical form of the hundreds chain of Figure 4C, employing reverse action relays, but the values of the powers of two are entered in a different order.

The powers of two are entered by moving to the left the keys of the keyboard 21, the keys being indicated by the powers of two which they represent. When the binary number has been entered by these keys, the arm 22, pivoted at 23, is turned slightly counterclockwise, to depress the pin 24 to effect the translation. The apparatus is shown in two parts, the line A being coincident in the two parts. The part on the left is the carry determining portion. The translation is shown by a downward movement of one of the pins 25 at the bottom of the right hand part. Fixed portions of the apparatus, serving as guides for the pins have the reference Figure 26.

The pin 24, adapted to slide in the fixed guide 26, bears on the pin 27. This is carried in the sliding bar 28 attached to the key of power 2. In the position shown the pin 27 bears on the pin 29 but, if the power of 2 be entered, the slide 28 moves the pin 29 to bear on the pin 30, while the pin 24 still bears on the pin 27. Thus, depression of the pin 24 causes depression of the pin 29 or the pin 30 depending on whether the power of 2 is not entered or is entered, respectively. Two pins 31 are carried by the slide 32 attached to the key of power 9 and, in the normal position shown, power 9 not being entered, they bear on the two pins 33 and 34. Pin 34 is attached to block 36 and, by bar 37 to block 38, in turn attached to pin 39. Consequently, with neither power 2 nor power 9 entered, depression of pin 24 causes depression of pin 33. If the powers of 2 and 9 be entered, the left hand pin 31 bears on pin 35 which, by a similar construction is attached to pin 40.

Pin 33 is depressed (on depressing pin 24) by left hand pin 31 and pin 30, if power 2 only be entered, and is depressed by right hand pin 31 and pin 29, if power 9 only be entered. Pin 33 bears on pin 41 carried by slide 42 attached by lever 43, pivoted at 44 to the key of power 7. This is a reverse acting key, the slide 42 being moved to the right on depression of the key. Pin 41 bears on pin 45 with the power of 7 not entered and on pin 46 when it is entered. Pin 46 is attached to block 36 and so is connected with pin 34; similarly pin 45 is connected with pin 35. The arrangement is such that, when pin 24 is depressed, if neither the powers of 2 or 9 be entered, pin 39 is depressed, whether or not the power of 7 be entered; if both the powers of 2 and 9 be entered, pin 40 is depressed, whether or not the power of 7 be entered; if the power of 2 or of 9 be entered alone, pin 40 is depressed, but if the power of 7 be entered as well, pin 39 is depressed.

Similar construction to these described are employed in the rest of the apparatus, and further explanation is deemed unnecessary. By way of example, the binary number assumed will be regarded as entered, the keys depressed being indicated by E, and the pins depressed are marked with D. It is seen that the pin 25, No. .6 is depressed, indicating the 600 digit of the equivalent decimal number 621. By similar constructions, the Tens and Units chains may be put into mechanical form.

From the foregoing it wil be appreciated that many variations of the electrical circuits are possible by taking slightly different equivalents, the requirement being that the sum of the equivalents taken must never give an error as great as "1" in the denomination being read out. These variations, however, lead to different numbers of contacts, but above all make possible the balancing up of the numbers of contacts required for any given power of 2 represented in the total translating chain. This must be in accordance with the number of switches which it is found convenient to operate from a single electromagnet. For example, 256 ($2^8$) may be represented in the hundreds chain in at least 3 different ways, e. g. direct entry of the 2 as a whole digit in the modulatory part of the chain and in the carry part of the chain a corrective fraction +.32, +.16, +.08, or by +.64, −.08, or in the third alternative, the digit 3 in the modulatory part of the chain and a fraction in the carry part of the chain of −.08, −.04. This would mean that in the first example the entry of 256 would be made in 4 places, or in the second and third examples 3 places. Owing to the variations in these places calling for different numbers of contacts, the number of contacts required on the relay $2^8$ may be conveniently adjusted. This retains a binary relationship of terms as expressed in the units of the decimal being translated.

An alternative is to retain the binary relationship in terms of the denomination being read out i. e. ½, ¼, ⅛, $\frac{1}{16}$, $\frac{1}{32}$, etc. to as many places as are necessary to secure the required accuracy in all combinations of the powers of 2 to be represented i. e. $2^7=128$ means .28 to be added in the carry part of the chain e. g. .25 (¼) and .03125 ($\frac{1}{32}$) assuming the eror of .00125 will not result in a carry when in combination with the other powers of 2.

What is claimed is:

1. In an apparatus for the translation of a number in binary notation into a number in decimal notation, a plurality of denominational groups of sets of contact switches, the switches of each set being selectively settable to represent various binary terms, means for causing the sets of contact switches of each group to be set to represent the full decimal equivalents of each of the binary terms of a number to be translated, circuit connections for each group for connecting the switches thereof in series, the connections for the units denominational group being arranged in accordance with the table of addition for the units order digits of the binary terms, to effect a complete connection extending through all the sets of switches of each group, and representing the units digit of the sum of the aforesaid equivalents of binary terms set in the units group, connections for the tens denominational group being arranged in accordance with the table of addition of units and tens order digits of the aforesaid equivalents of binary terms to effect a complete connection extending through all the sets of switches of such group and representing the tens digit of the sum of the binary terms set in the tens group, and current responsive devices included in the connections of each group of switches to indicate the digital value of the completed connection.

2. The invention set forth in claim 1, in which a hundreds denominational group is provided the connections of which are arranged in accordance with the table of addition of the units, tens and hundreds order digits of the binary terms to effect complete connection extending through all the sets of switches of such group and representing the hundreds digit of the sum of the aforesaid equivalents of binary terms set in the hundreds group.

3. The invention set forth in claim 1, in which the circuit connections for the units denominational group are arranged in accordance with the table of algebraic addition with certain of the switches being connected for subtraction of the tens complement of the units order digit of the related binary term.

4. In combination, an addition network for determining the tens digit of a number to be translated from the binary system of notation comprising a first sub-group of settable contact switches, a second sub-group of settable contact switches, means for setting said switches to represent the full decimals equivalents of each of the binary terms of a number to be translated, there being a switch in the first sub-group representative of each binary term whose units digital value is essential to the determination of said tens digit of the number, there being a switch in the second sub-group representative of each binary term whose tens digital value is essential to the determination of said tens digit of the number, a first partial circuit connection extending through the switches of the first sub-group and representing the tens digit of the sum of the aforesaid equivalents of binary terms set in said first sub-group, and a second partial circuit connection extending through the switches of the second sub-group and representing the units digit of the sum of the aforesaid equivalents of binary terms set in the second sub-group, said first and second partial circuit forming a continuous circuit connection representing the sum of the respective values which constitute the tens digit of the number.

5. In combination, an adding network for determining the hundreds digit of a number to be translated from the binary system of notation comprising a first sub-group of settable contact switches, a second sub-group of settable contact switches, means for setting said switches to represent the full decimal equivalents of each of the binary terms of a number to be translated, there being a switch in the first sub-group representative of each binary term whose tens and/or units digital values are essential to the determination of said hundreds digit of the number, there being a switch in the second sub-group representative of each binary term whose hundreds digital value is essential to the determination of said hundreds digit of the number, a first partial circuit connection extending through the switches of the first sub-group and representing the hundreds digit of the sum of the aforesaid equivalents of binary terms set in said first sub-group, and a second partial circuit connection extending through the switches of the second sub-group and representing the units digit of the sum of the aforesaid equivalents of binary terms set in said second sub-group, said first and second partial connections forming a continuous circuit connection representing the sum of their respective values which constitute the hundreds digit of the number.

RAYMOND L. A. VALTAT.

REFERENCES CITED

The following references are of record in the file of this patent:

UNITED STATES PATENTS

| Number | Name | Date |
|---|---|---|
| 2,350,499 | Dickinson | June 6, 1944 |
| 2,364,540 | Luhn | Dec. 5, 1944 |
| 2,394,924 | Luhn | Feb. 12, 1946 |
| 2,444,042 | Hartley et al. | June 29, 1948 |

FOREIGN PATENTS

| Number | Country | Date |
|---|---|---|
| 581,215 | France | Sept. 23, 1924 |